United States Patent [19]

Bignell

[11] 4,450,497
[45] May 22, 1984

[54] ULTRA-HIGH-SPEED RELAY

[75] Inventor: Allan M. Bignell, Mississauga, Canada

[73] Assignee: Westinghouse Canada, Hamilton, Canada

[21] Appl. No.: 436,101

[22] Filed: Oct. 22, 1982

[51] Int. Cl.³ .............................................. H02H 3/40
[52] U.S. Cl. ........................................ 361/82; 361/80; 361/84
[58] Field of Search ....................... 361/82, 80, 84, 79, 361/83, 81; 324/51, 52

[56] References Cited

U.S. PATENT DOCUMENTS

| | | | |
|---|---|---|---|
| 3,599,044 | 8/1971 | Takemura | 361/82 |
| 3,700,919 | 10/1972 | Stich | 361/82 X |
| 4,287,547 | 9/1981 | Vitins | 361/82 |
| 4,371,907 | 2/1983 | Bignell | 361/82 |

*Primary Examiner*—Patrick R. Salce
*Attorney, Agent, or Firm*—J. L. DeAngelis, Jr.

[57] ABSTRACT

Protective relay apparatus for detecting the direction or distance to a fault from the measuring point on an ac electrical power transmission line using current and voltage deviation signals. The deviation signals represent the changes induced by the fault from the steady-state pre-fault magnitudes. Trajectories are plotted on an X-Y plane using the voltage deviation signal as the X-axis coordinate and the differentiated current deviation signal multiplied by the line reactance to the balance point as the Y-axis coordinate. Due to the use of the differentiated current deviation signal, the trajectories are straight lines. The threshold boundaries for determining the distance to or direction of the fault are time-varying lines of unit slope representing the pre-fault voltage at the fault point. For a fault outside the balance point, the trajectory lags the threshold boundary; for a fault at the balance point, the trajectory is always equal to the balance point voltage; and for a fault inside the balance point, the trajectory always leads the threshold boundary.

12 Claims, 14 Drawing Figures

ULTRA-HIGH-SPEED RELAY

BACKGROUND OF THE INVENTION

1. Field of the Invention

This invention relates generally to protective relay apparatus for protecting ac electrical power transmission lines, and more specifically, to ultra-high-speed relays.

2. Description of the Prior Art

Three-phase ac electrical transmission lines and power generating equipment must be protected against insulation faults and consequent short circuits or drops in shunt resistance that could cause collapse of the power system, serious and expensive apparatus damage, and personal injury. For instance, such a fault is caused by lightning-induced flashover from a transmission line to ground or between transmission line conductors. Under such a faulted condition, line currents can increase to several times the normal value thereby causing loss of synchronism among generators and damaging or destroying both the transmission line and the attached equipment.

To avoid equipment damage and collapse of the entire power system, faulted apparatus on the main transmission line must be isolated from the network in 0.1 to 0.5 seconds. The isolation time limit must allow for the operation of large circuit breakers interrupting up to 80,000 A. and completion of back-up operations if these primary protective devices fail to function properly. To allow sufficient time for circuit interruption, the location of the fault must be determined in approximately 8 ms to 20 ms. It is the function of the protective relays, which continuously monitor ac voltages and currents, to locate line faults and initiate isolation via tripping of the appropriate circuit breakers.

The direction and distance to a fault with reference to a measuring location on a transmission line is usually determined with the aid of distance relays. These relays incorporate electromechanical or electronic elements requiring substantially sinusoidal power-frequency input signals to function correctly. When a fault occurs on the transmission line, there is a deviation in the power-frequency current and voltage signals and transient traveling waves are also generated. Since the power-frequency signals as distorted by the traveling wave are not suitable for detection by a distance relay, operation of the protective relay must await decay of the distortion effects, i.e., the traveling waves. This decay is a comparatively slow process. Alternatively, frequency filters may be used to filter the effects of the transient traveling waves thereby enabling the power frequency components to be evaluated by the protective relay at an earlier time. By evaluating the change in the power-frequency signals after the fault as compared to the steady-state values before the fault, distance relays can make independent or zone 1 trip decisions.

One prior art approach for making such zone 1 trip decisions, disclosed in U.S. Pat. No. 4,287,547, plots the trajectory of the fault-generated voltage and current deviations as a function of time on a deviation plane, with the voltage deviation on the X-axis and the current deviation on the Y-axis. The plot defines an elliptical orbit with clockwise rotation indicating a fault in the forward direction. Zone 1 threshold boundaries are established in each quadrant and if the trajectory crosses a forward boundary, it is known that the fault is in the forward direction and within the protected zone.

This zone 1 trip decision, however, is complicated by the fact that the position and shape of the elliptical orbit is a function of both the fault inception angle $\gamma$ and the source impedance $X_s$. Thus, it is extremely difficult to set the boundary thresholds for zone 1 trips.

U.S. Pat. No. 4,371,907, which is assigned to the same assignee as the present invention solves the practical problems associated with the elliptical trajectory concept by differentiating the current deviation signal and using this differentiated signal as the Y-axis coordinate. Alternatively, the voltage deviation signal may be integrated. For making independent or zone 1 trip decisions, the traveling wave response is filtered from the deviation signals. Instead of an ellipse having a rotational direction responsive to fault direction, a forward fault produces a straight line trajectory on this transformed deviation plane with the straight line crossing the origin between the second and fourth quadrants for a forward direction fault.

Unlike the elliptical orbit, where position and shape is dependent upon the fault inception angle $\gamma$ and the source impedance $X_S$, the straight-line trajectories are unaffected by fault inception angle. Only the slope of the straight line trajectory changes with source impedance. Thus, the boundary thresholds for detecting a zone 1 fault need not be set for the "worst case," i.e., to accommodate the full range of possible $X_s$ and $\gamma$ values, as would be required for the prior art elliptical trajectory approach. The straight-line trajectory prior art protective relay may therefore be set for a much greater percentage of the protected line, and it detects and clears more zone 1 faults better than a system using an elliptical orbit concept.

The present invention represents an important improvement over the above-referenced U.S. Pat. No. (4,371,907). The boundary thresholds of the prior art relay are represented by fixed straight lines established on the basis of the expected peak amplitudes of the differentiated current deviation signal and the voltage-deviation signal. The present invention discloses a variable threshold boundary to provide faster fault detection. That is, the threshold boundary varies over time in accord with the straight line trajectory, and therefore tripping does not have to await crossing of a fixed straight line threshold by a peak value of the differentiated current-deviation signal or of the voltage-deviation signal.

SUMMARY OF THE INVENTION

A protective relay for determining the direction to a fault, from a measuring point on an electrical power transmission line energized by an ac power source, and for determining if the fault is within a predetermined distance from the measuring point, is disclosed. The protective relay measures the fault-generated current and voltage deviations from the steady-state pre-fault values. After filtering to remove transients due to fault-induced traveling wave activity, the current signal is differentiated (or the voltage signal is integrated). The time-varying voltage and differentiated current-deviation signals are plotted in an X-Y plane using the voltage-deviation and differentiated current-deviation signals as X and Y coordinates, respectively. A time-varying threshold boundary is established in two predetermined quadrants of the X-Y plane and comparators determine when the time-varying trajectory crosses the time-varying threshold boundary thereby indicating that the fault is in the forward direction and within the predetermined distance from the relay. Time-varying threshold boundaries can also be established in the other two quadrants to detect reverse direction faults. This determination causes tripping of the appropriate circuit breaker to isolate that portion of the ac electrical power transmission line.

BRIEF DESCRIPTION OF THE DRAWINGS

The invention may be better understood and further advantages and uses thereof more readily apparent, when considered in view of the following detailed description of exemplary embodiments, taken with the accompanying drawings in which.

DESCRIPTION OF THE PREFERRED EMBODIMENT

1. Fundamental Principles

Figure 1:
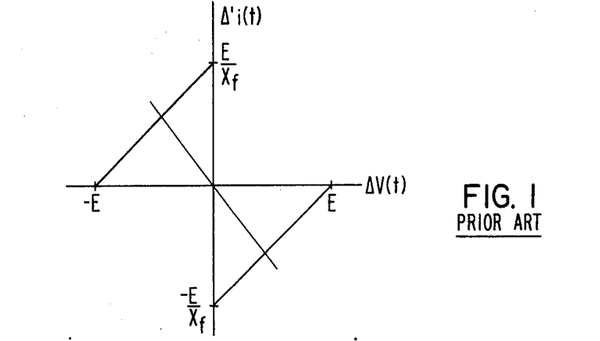
FIG. 1 is a graph of the transformed deviation plane illustrating a straight-line trajectory and the fixed straight-line threshold boundaries of the prior art distance relay.

In the prior art (U.S. Pat. No. 4,371,907) referred to above, fixed straight-line threshold boundaries are established on the transformed deviation plane wherein the voltage deviation with respect to time is plotted on the X axis and the derivative of the current deviation with respect to time is plotted on the Y axis. The fixed threshold is exceeded, indicating the occurrence of a fault, only when a peak value of the voltage deviation or derivative of the current deviation exceeds a threshold boundary. That is, the threshold boundaries represent a line of constant fault reactance for the case of the peak amplitudes of the voltage deviation and the derivative of the current deviation. Using the fixed threshold boundaries, a fault cannot be detected until the occurrence of the peak amplitude of the voltage deviation or the derivative of the current deviation. In the prior art patent application, the threshold boundary is defined by the equation:

$$\frac{d}{dt}\Delta i(t) = \frac{1}{X_f}\Delta v(t) + \frac{E}{X_f} \quad (1)$$

where $\Delta i(t)$ is the current deviation and $\Delta v(t)$ is the voltage deviation from pre-fault values; $X_f$ is the line impedance to the fault (assumed to be pure reactance), and E is the peak source voltage. Exemplary threshold boundaries and a trajectory of the type defined by equation (1) is shown in FIG. 1.

Note that equation (1) defines the fixed threshold boundaries associated with the prior art patent application. The use of fixed thresholds is equivalent to setting the relay based upon the peak values of the current and voltage deviations. For faults occurring near voltage peaks the trajectory immediately crosses a fixed threshold. But, for faults occurring at other points on the waveform there is a delay until the trajectory crosses a fixed threshold. By utilizing moving thresholds the trajectory immediately crosses a threshold for faults occurring at any initiation angle. The use of moving thresholds is the essence of the present invention.

Figure 2A:
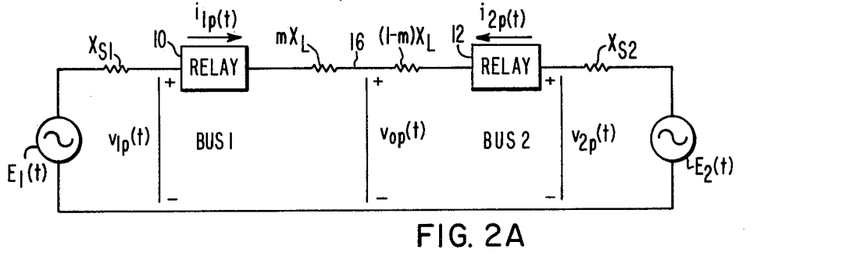
FIGS. 2A, 2B, and 2C depict the pre-fault, fault, and post-fault models, respectively, for a conventional power system.
Figure 2B:
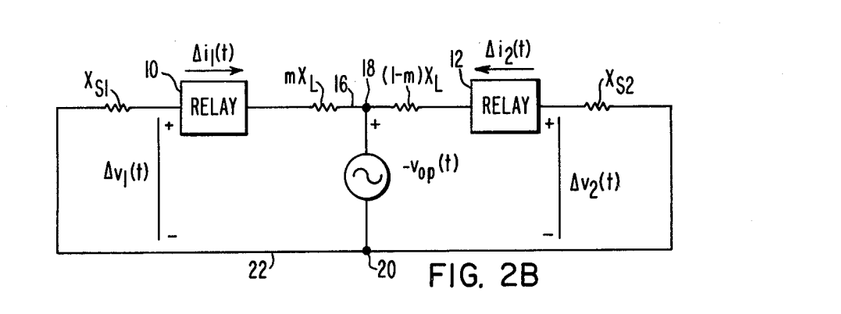
Figure 2C:
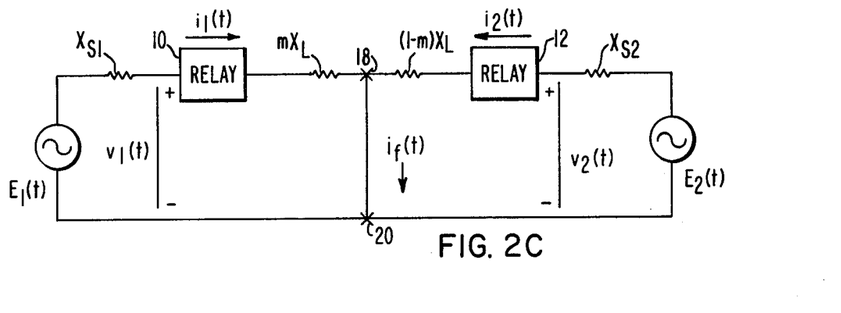

To properly explain the operating principles of the present invention, transmission line models are shown in FIGS. 2A, 2B, and 2C. A pre-fault model is depicted in FIG. 2A, a fault model in FIG. 2B, and a post-fault model in FIG. 2C. In FIG. 2A sources $E_1(t)$ and $E_2(t)$ with source impedances $X_{s1}$ and $X_{s2}$, respectively, supply power to a transmission line 16. The transmission line 16 includes the relays 10 and 12, and transmission line impedances $mX_L$ and $(1-m)X_L$. In the fault model of FIG. 2B, it is assumed that a fault has occurred between a point 18 on the transmission line 16 and a point 20 on a neutral conductor 22. A source $-v_{op}(t)$ is inserted between the points 18 and 20; as is well-known in the art, the source $-v_{op}(t)$ represents the opposite of the pre-fault voltage between the points 18 and 20. In the FIG. 2C post-fault model, a fault current $i_f(t)$ is shown.

From the post-fault network shown in FIG. 2C, it is seen that:

$$\overline{V}_1 = \overline{I}_1 \cdot m\overline{X}_L$$

(The bars denote phasor notation). In a typical distance relay the current $\overline{I}_1$ is passed through a replica or compensator impedance $\overline{Z}_R$ and the resulting voltage is subtracted from the bus voltage $\overline{V}_1$. This derived quantity is called the operating voltage. If the fault reactance $m\overline{X}_L$ is equal to the replica impedance $\overline{Z}_R$ then the fault is at the balance point and the operating voltage is zero. If the fault is inside or outside the balance point the operating voltage is either positive or negative. To determine the sign of the operating voltage it is phase compared with the voltage $\overline{V}_1$ which is called the polarizing voltage. If the operating and polarizing voltages are 180° out-of-phase the fault is inside the balance point. If the operating and polarizing voltages are in-phase the fault is outside the balance point.

Figure 3:
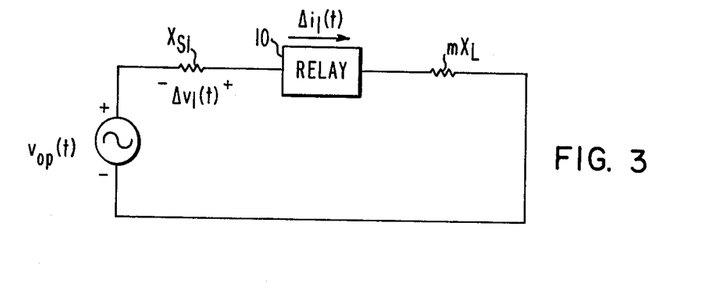
FIG. 3 is a simplification of the post-fault model of FIG. 2C.

The same techniques can now be applied to the model of FIG. 2B. If zero fault resistance is assumed, the circuits to the left and right of the fault in FIG. 2B are decoupled and can be considered separately. With respect to the relay 10, the model of FIG. 2B can be rearranged as shown in FIG. 3. Due to the similarity between the models of FIGS. 2C and 3, the same techniques can be used to determine the distance to the fault. The following equation applies (the numerical subscripts have been omitted to generalize the equation).

$$\overline{V}_{op} = \Delta\overline{V} + \Delta\overline{I} \cdot m\overline{X}_L \quad (2)$$

Equation (2) is valid regardless of fault initiation angle and source reactance. In instantaneous form:

$$v_{op}(t) = -\Delta v(t) + L_L\left(\frac{d}{dt}\Delta i(t)\right) \tag{3}$$

This can be rearranged to give:

$$L_L\left(\frac{d}{dt}\Delta i(t)\right) = \Delta v(t) + v_{op}(t) \tag{4}$$

Equation (4) can be compared with the general equation of a straight line, $y=mx+b$, in a normal cartesian coordinate system where m is the slope and b is the Y-axis intercept. Equation (4) represents the equation of a straight line with a slope of unity and a Y-axis intercept of $v_{op}(t)$ in a transformed deviation plane where the Y-axis is represented by $$L_L\left(\frac{d}{dt}\Delta i(t)\right)$$

and the X-axis is represented by $\Delta v(t)$. Note that in the present invention the Y-axis intercept ($v_{op}(t)$) varies as a function of time whereas the Y-axis intercept is constant ($E/X_f$) in the prior art patent application. Taking the derivative of the current deviation and scaling it by a term $L_R$, where $L_R$ determines the relay setting, produces a coordinate system where in-phase voltages are graphed on both axes.

There are several advantages to this approach using the transformed deviation plane. First note that the dependence on the fault initiation angle or fault current asymmetry is removed because differentiation effectively blocks all d.c. components. Since both voltages are in-phase they produce a straight line trajectory. This follows from the fact that the voltages are sinusoidal and reach their peaks, zeros, and intermediate values, at the same time. Since the same current $\Delta i(t)$ flows through reactances $X_s$ and $mX_L$, the slope of this straight line trajectory depends upon some ratio of fault to source reactance. (The disclosure of the prior art patent application is hereby incorporated by reference; for details of the transformed deviation plane in excess of those included herein, reference should be made to that application.)

Equation (4) can be considered a line of constant fault reactance, as specified by $L_L$, in the transformed plane. At any time a threshold can therefore be defined corresponding to the relay balance point, by specifying a relay setting $L_R$. Note that in this case the threshold is not fixed but instead is a straight line of slope one whose Y-axis intercept changes with $v_{op}(t)$. Thus, the threshold now moves in a fashion similar to the trajectory. A relationship may be drawn between this threshold and the straight line trajectories. If a fault occurs at the balance point then $L_L=L_R$ and at any time the point on the trajectory lies directly on the threshold. If $L_L$ is less than $L_R$ the fault is inside the balance point and the relay trips. If $L_L$ is greater than $L_R$ the fault is outside the balance point.

Figures 4A, 4B, 4C:
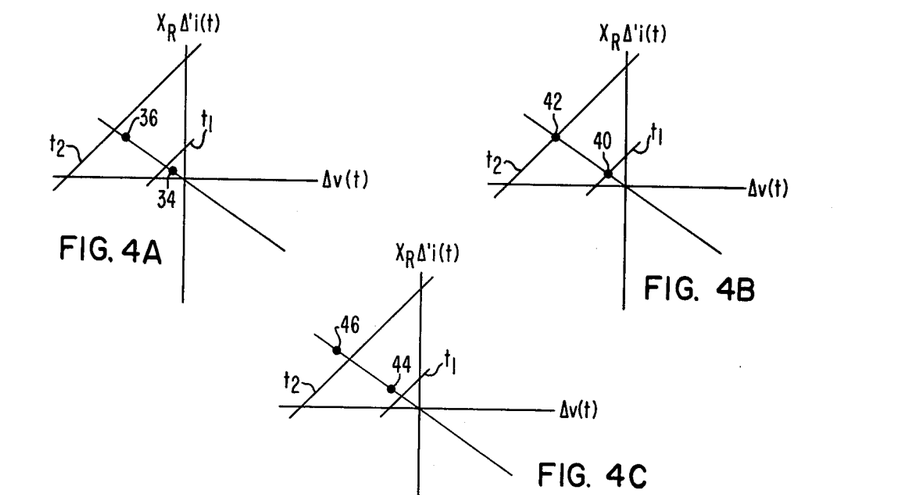
FIGS. 4A, 4B, and 4C are graphs of a straight-line trajectory and the time-varying threshold boundary of the present invention.

The concept of a time-varying threshold boundary is illustrated in FIGS. 4A, 4B, 4C wherein a threshold boundary is shown at times $t_1$ and $t_2$ in the second quadrant of the X-Y plane. If the fault is beyond the balance point, the fault trajectory always lags the threshold boundary. For example, in FIG. 4A the trajectory is at a point 34 at time $t_1$ and at a point 36 at time $t_2$. FIG. 4B illustrates the situation where the fault is located at the balance point. In this case, the trajectory is always at the threshold boundary. For example, at $t_1$ the trajectory is at a point 40 on the threshold boundary and at $t_2$ the trajectory is at a point 42 also on the threshold boundary. In FIG. 4C, the fault is inside the balance point and the fault trajectory exceeds the threshold boundary at all times. For example, at time $t_1$ the trajectory is at a point 44 beyond the threshold boundary and at time $t_2$ the trajectory is at a point 46 also beyond the threshold boundary.

Figure 5:
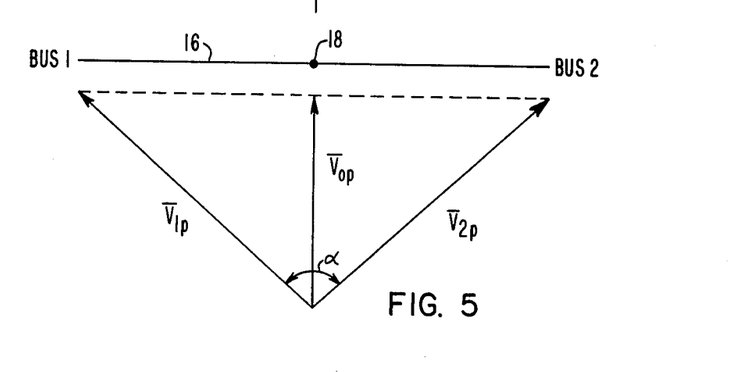
FIG. 5 is a phasor diagram for the transmission line of FIGS. 2A, 2B, and 2C.

To obtain the moving threshold illustrated in FIGS. 4A, 4B and 4C it is necessary to determine the quantity $v_{op}(t)$ in Equation (4). If it is assumed that there is no pre-fault load flow (real component of power) then $\overline{V}_{op}=\overline{V}_{1p}=\overline{V}_{2p}$ in FIG. 2A. If load flow does exist then $\overline{V}_{op}$ will be a voltage whose magnitude is less than $\overline{V}_{1P}$ and $\overline{V}_{2P}$, and whose phase either leads or lags $\overline{V}_{1p}$ depending upon the direction of load flow (assuming no reactive power transfer). In FIG. 5, voltage $\overline{V}_{1P}$ leads $\overline{V}_{2P}$ by an angle $\alpha$ thus causing a load flow into the bus 2. Considering a fault in the middle of the transmission line 16, causing the magnitude of $\overline{V}_{op}$ to be at its lowest value, should give the large difference in magnitude between $\overline{V}_{1P}$ and $\overline{V}_{op}$. Assuming an angle across the transmission line 16 of 60°, the magnitude of $\overline{V}_{op}$ is 86.6% of $\overline{V}_{1P}$. The error introduced by assuming the magnitude of $\overline{V}_{op}$ to be that of $\overline{V}_{1P}$ appears to be slight. This assumption causes only an under-reaching effect for the relay that becomes less significant as the fault point moves away from the middle of the transmission line 16. The problem of phase difference between $V_{1P}$ and $V_{op}$, however, is much more serious.

Figure 6A:
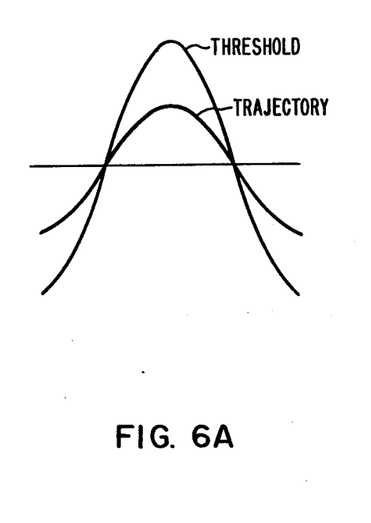
FIGS. 6A, 6B, and 6C illustrate possible relationships between the trajectory and the threshold boundary.
Figure 6B:
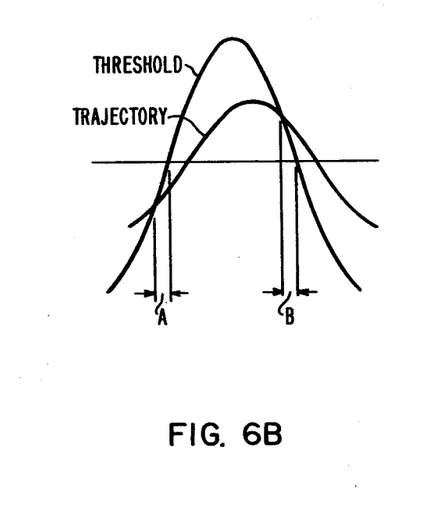

The moving threshold concept requires that the trajectory and threshold have the same phase. See FIGS. 6A, 6B, and 6C. In FIG. 6A, the two curves are in phase and the curve corresponding to the threshold is always larger than the one corresponding to the trajectory. It is analogous to the trajectory always being behind the threshold, where the term behind implies less positive in the positive half cycle and less negative in the negative half cycle. The problem occurs when the trajectory curve leads (or lags) the threshold curve as shown in FIG. 6B. In this case, regions of incorrect operation, labelled A and B, cause incorrect indications to occur. The problem is even more acute when the fault approaches the balance point and the trajectory curve is almost in phase and as large as the threshold curve (see FIG. 6C). In this situation the regions of incorrect operation are nearly 90°. It is interesting to note that 90° is the limit to this possible area of misoperation and it is approached when the fault location nears the balance point.

Figure 6C:
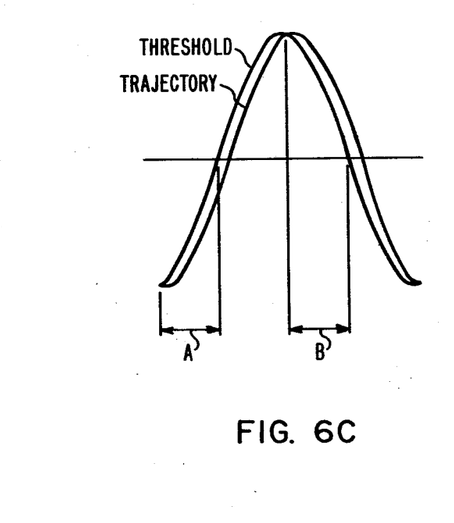

To overcome the problem illustrated in FIGS. 6A, 6B, and 6C, it is necessary to use a coincidence timer. The coincidence timer requires the trajectory to lead the threshold for a predetermined time before a trip signal is produced.

Studying FIGS. 6A, 6B, and 6C, it is apparent that the region of incorrect indication is dependent on the phase and magnitude difference between the two signals. In general, equations can be written for sinusoids of different magnitudes and phases.

$$f_1(\omega t) = A \sin \omega t \tag{5}$$

$$f_2(\omega t) = B \sin(\omega t + \alpha) \tag{6}$$

Solving equations (5) and (6) for the total angle of incorrect indication, $\phi$:

$$\phi = \omega t = \tan^{-1}\left[\frac{B \sin \alpha}{A - B\cos\alpha}\right] \quad (6)$$

The angle $\phi$ corresponds to a time T where:

$$T = \phi \times 360/16.67 \text{ ms} \quad (7)$$

Equation (7) defines the total continuous time during which incorrect indication occurs. Therefore, using a coincidence time greater than T prevents misoperation. If no overreach at the balance point is desired, then a coincidence time of 90° or about 4.17 ms must be used.

2. Description and Operation of the Invention

Figure 7:
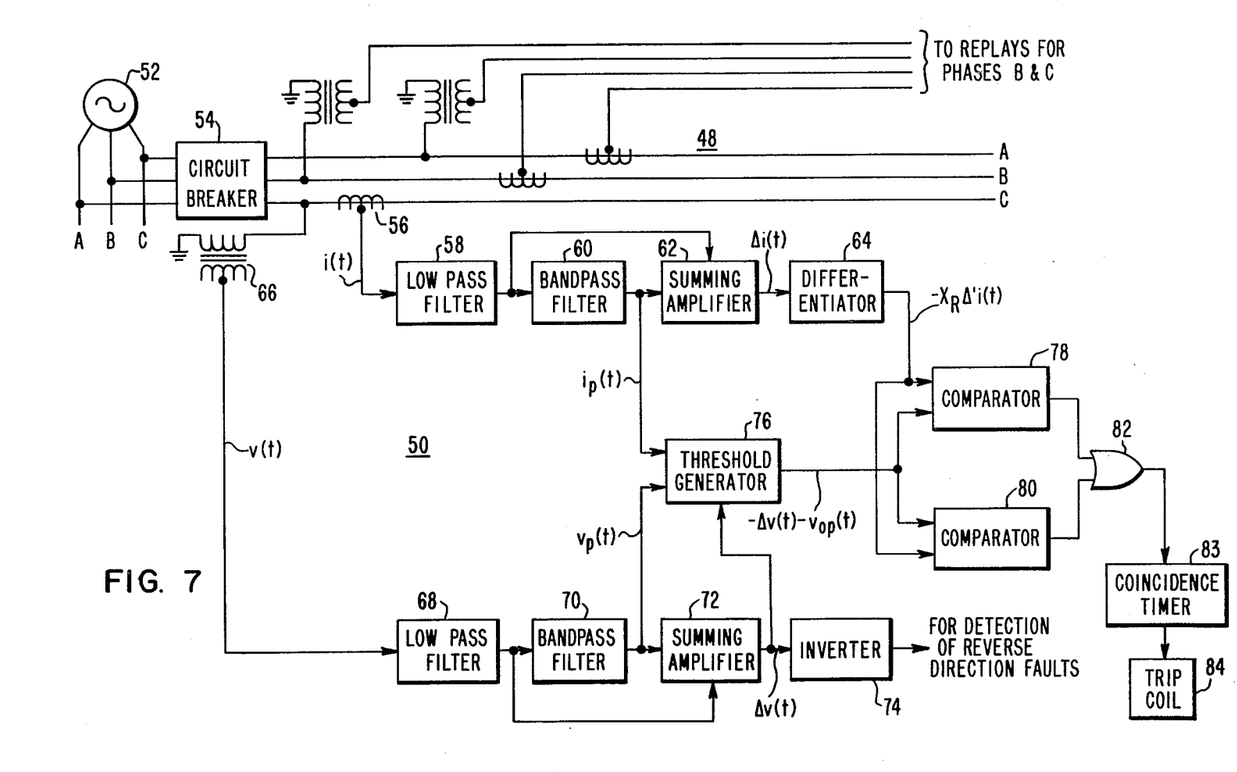
FIG. 7 is a partial schematic and partial block diagram of a protective relay system for protecting an electrical power transmission line, wherein the protective relay is constructed according to the teachings of the present invention.

Turning now to FIG. 7, there is shown a three-phase electrical power transmission line system 48 protected by a protective relay 50 constructed according to the teachings of the present invention. In the exemplary embodiment of FIG. 5, each phase of the three-phase electrical power transmission line system 48 is monitored for faults by a protective relay similar to the protective relay 50, and thus only the protective relay 50 is shown and discussed in detail.

The three-phase electrical power transmission line system 48 includes a power source 52 having a power frequency of 50 Hz or 60 Hz, for example. The power source 52 is connected to the three-phase electrical power transmission line system 48 via a circuit breaker 54.

The protective relay 50 is an ultra-high-speed relay capable of operating in a directional comparison mode (providing only direction to the fault) and in an independent zone 1 mole. In the directional comparison mode, the relay is set to overreach the protected line segment. Also, in this mode a slight amount of filtering (a low-pass filter with a cut-off frequency of approximately 1 kHz) is used only to reduce the effects of high-frequency components due to lightening strikes or coupled noise from adjacent circuits. Since the filtering is slight there is little delay and the relay operates faster, but the accuracy of the overreach is poor. In the directional comparison mode, however, the lack of an accurate overreach is of little consequence. As the amount of filtering is increased, the accuracy of the relay's reach improves, but operation is slower. Thus, a compromise between the amount of filtering and operation speed depends on the particular application in which the protective relay 50 is used. The protective relay 50 utilizes the voltage and current deviations from the steady-state as caused by the fault to make the trip decision.

A current transformer 56 is magnetically coupled to phase A of the three-phase electrical power transmission line system 48 for producing a signal i(t). The signal i(t) is composed of two components: power frequency components at the frequency of the power source 52, and high-frequency components. The signal i(t) is input to a low pass filter 58 of the protective relay 50 for filtering the high-frequency components as discussed above. An output terminal of the low pass filter 58 is connected to an input terminal of a bandpass filter 60. The bandpass filter 60 is a high Q bandpass filter serving as a "memory" to provide a measurement of the pre-fault steady-state current. A signal $i_p(t)$, representing the pre-fault steady-state current, is produced by the bandpass filter 60.

The output terminal of the low pass filter 58 is connected to a first input terminal of a summing amplifier 62. A second input terminal of the summing amplifier 62 is responsive to $i_p(t)$. The summing amplifier 62 produces an output signal $\Delta i(t)$ representing the fault-induced current deviation from the pre-fault steady-state current (i.e., $\Delta i(t)$ equals the output signal from the low pass filter 58 minus $i_p(t)$). The signal $\Delta i(t)$ is differentiated through a gain $X_R$, which represents the setting of the protective relay 50 or the reactance of phase A of the three-phase electrical power transmission line system 48 at the balance point, in a differentiator 64. The output signal from the differentiator 64 therefore represents $-X_R\Delta'i(t)$.

A potential transformer 66 is connected between phase A of the three-phase electrical power transmission line system 48 and ground for producing a voltage signal v(t). The signal v(t) comprises high-frequency and power-frequency components. To filter the high-frequency components, the signal v(t) is input to a low-pass filter 68. As discussed above, the cut-off frequency of the low-pass filter 68 depends on the application of the protective relay 50. An output terminal of the low pass filter 68 is connected to an input terminal of a bandpass filter 70. The bandpass filter 70 is a high-Q bandpass filter serving as a "memory" to provide a measurement of the pre-fault steady-state voltage. A signal $v_p(t)$, representing the pre-fault steady-state voltage, is produced by the bandpass filter 70.

The output terminal of the low pass filter 68 is input to a first input terminal of a summing amplifier 72. A second input terminal of the summing amplifier 72 is responsive to $v_p(t)$. An output signal from the summing amplifier 72 represents the voltage deviation $\Delta v(t)$. Like the current deviation signal $\Delta i(t)$, the voltage deviation signal $\Delta v(t)$ is the difference between the post-fault and pre-fault ($v_p(t)$) steady-state voltages on phase A of the three-phase electrical power transmission line system 48. Since the differentiated current deviation signal has been subjected to one additional polarity inverting stage by the differentiator 64, the signal $\Delta v(t)$ is applied to an inverter 74 to preserve the original polarity relationship between the differentiated current deviation signal $-X_R\Delta'i(t)$ and the voltage deviation signal $\Delta v(t)$. An output terminal of the inverter 74 is connected to a comparator (not shown in FIG. 7) for detecting reverse direction zone 1 faults.

Instead of differentiating the current deviation signal, $\Delta i(t)$, it is equally suitable to integrate the voltage deviation signal $\Delta v(t)$. For the protective relay 50 to function properly, it is required that at least one of the deviation signals be transformed such that the order of differentiation of the current deviation signal is one order higher than the voltage deviation signal. As a practical matter, only one of the deviation signals is transformed, i.e., the current deviation signal is differentiated or the voltage deviation signal is integrated. Note, that differentiation is considered the inverse of integration. The current deviation signal may be differentiated twice and the voltage signal differentiated once, or the current signal may be integrated once and the voltage signal integrated twice. Although many combinations are possible, for purposes of the exemplary embodiment of FIG. 7, the current deviation signal is differentiated once, and the voltage deviation signal is neither differentiated nor integrated. Further, it is preferable to differentiate the current deviation signal, rather than integrate the voltage deviation signal, because doing so removes the dc component of the current deviation signal and simplifies the protective relay 50.

The signal $i_p(t)$ from the bandpass filter 60 is input to a first terminal of a threshold generator 76. The signal $v_p(t)$ from the bandpass filter 70 is input to a second input terminal of the threshold generator 76. The signal $\Delta v(t)$ from the summing amplifier 72 is input to a third input terminal of the threshold generator 76. (Note, as discussed above in Section 1. Fundamental Principles the signal $v_p(t)$ is used to represent the voltage at the fault point, $v_{op}(t)$, because the difference in magnitude between $v_p(t)$ and $v_{op}(t)$ is not substantial.) The threshold generator 76 produces a signal representing the quantity $(-\Delta v(t)) - v_{op}(t))$. (See equation (4).)

The signal $-\Delta v(t) - v_{op}(t)$ from the threshold generator 76 is input to a first input terminal of a comparator 78 and a first input terminal of a comparator 80. The signal $-X_R\Delta' i(t)$ is input to a second input terminal of the comparators 78 and 80. The comparator 78 compares the two signals input thereto during the positive half of the voltage cycle, and the comparator 80 compares to the two signals input thereto during the negative half of the voltage cycle. If the signal $-X_R\Delta' i(t)$ exceeds the signal $-\Delta v(t) - v_{op}(t)$ in the comparator 78, an output terminal of the comparator 78 goes high. If the signal $-X_R\Delta' i(t)$ exceeds the signal $-\Delta v(t) - v_{op}(t)$ in the comparator 80, an output terminal thereof goes high.

The output terminal of the comparator 78 is connected to a first input terminal of an OR gate 82; and the output terminal of the comparator 80 is connected to a second input terminal of the OR gate 82. When the output terminal of either the comparator 78 or the comparator 80 goes high, an output terminal of the OR gate 82 also goes high. The output terminal of the OR gate 82 is connected to an input terminal of a coincidence timer 83. As discussed above, the coincidence timer 83 insures that the trajectory leads the threshold for a predetermined time before a trip signal is produced. When the input terminal of the coincidence timer 83 is high for the predetermined time, an output terminal thereof goes high and latches in the high state, thereby producing the trip signal. In an independent zone 1 application the output terminal of the coincidence timer 83 is connected to an input terminal of a trip coil 84. The trip coil 84 trips the circuit breaker 54 when the input terminal thereof goes high. If the protective relay 50 is used in a directional comparison mode, the trip coil 84 is not present. Instead, the protective relay 50 communicates with a similar protective relay (not shown in FIG. 7) at the remote end of the three-phase electrical power transmission line system 48 to determine if the fault is located thereon.

Figure 8:
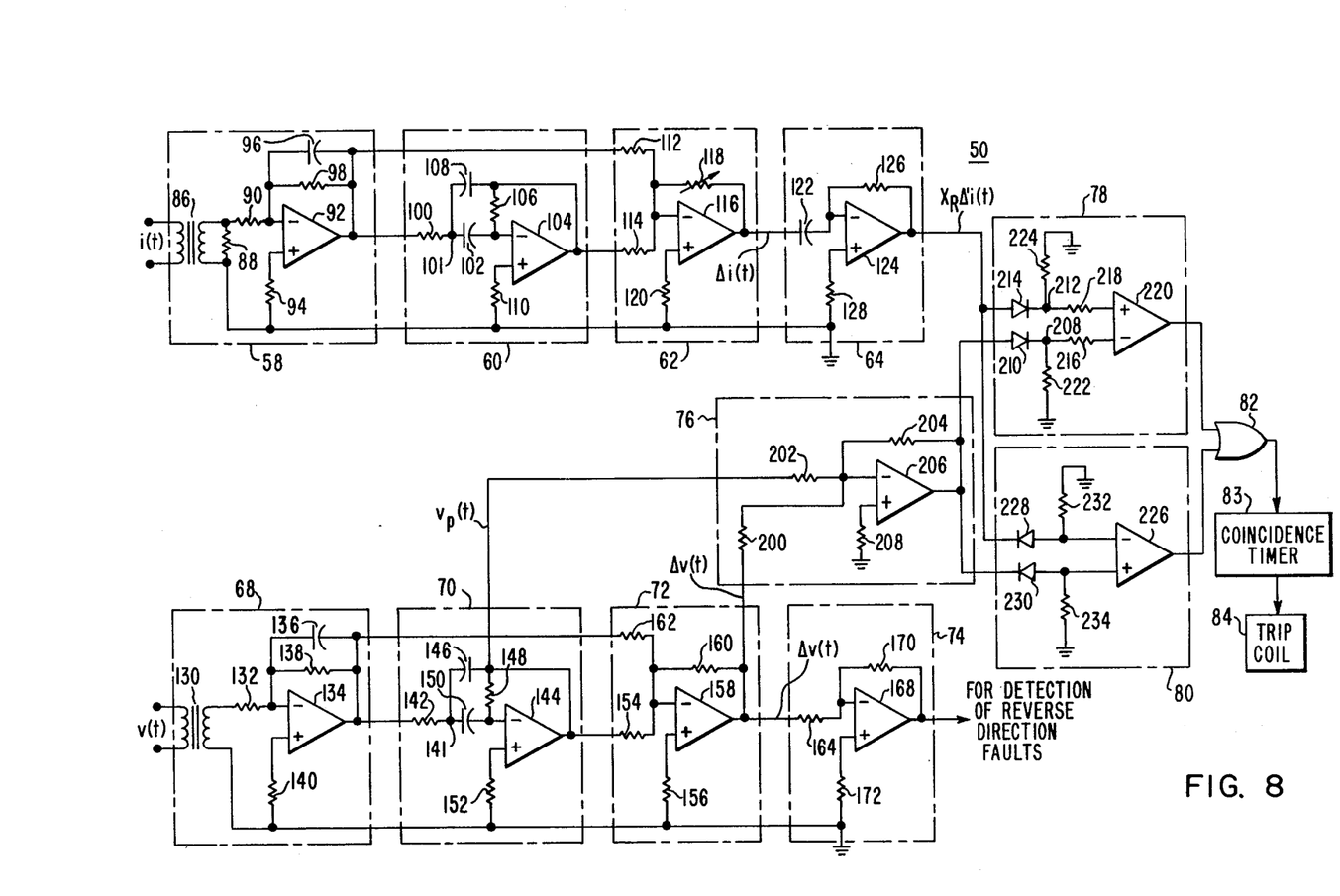
FIG. 8 is a schematic diagram illustrating an exemplary embodiment for the protective relay disclosed in FIG. 7.

FIG. 8 illustrates an exemplary schematic embodiment of the protective relay 50. The signal $i(t)$ from the current transformer 56 (not shown in FIG. 8) is input across the primary coil of an isolation transformer 86. A resistor 88 is connected across a secondary coil of the isolation transformer 86. A first terminal of the resistor 88 is connected to ground and a second terminal thereof is connected to an inverting input terminal of an operational amplifier 92 via a resistor 90. A non-inverting input terminal of the operational amplifier 92 is connected to ground via a resistor 94. An output terminal of the operational amplifier 92 is connected to the inverting input terminal thereof via a parallel combination of a capacitor 96 and a resistor 98. The isolation transformer 86, the operational amplifier 92, and the resistors and capacitors associated therewith constitute the low pass filter 58 of the protective relay 50.

The output terminal of the operational amplifier 92 is connected to an inverting input terminal of an operational amplifier 104 by a series combination of a resistor 100 and a capacitor 102. A terminal 101 between the resistor 100 and the capacitor 102 is connected to an output terminal of the operational amplifier 104 via a capacitor 108. A resistor 106 is connected between the output terminal of the operational amplifier 104 and the inverting input terminal thereof. A non-inverting input terminal of the operational amplifier 104 is connected to ground via a resistor 110. The signal at the output terminal of the operational amplifier 104 is $i_p(t)$. The operational amplifier 104 and the resistors and capacitors associated therewith constitute the bandpass filter 60.

The output terminal of the operational amplifier 92 is connected to an inverting input terminal of an operational amplifier 116 via a resistor 112. The inverting input terminal of the operational amplifier 116 is also connected to the output terminal of the operational amplifier 104 via a resistor 114. A non-inverting input terminal of the operational amplifier 116 is connected to ground via a resistor 120. An output terminal of the operational amplifier 116 is connected to the inverting input terminal thereof via a variable resistor 118. The variable resistor 118 is set to provide a gain for the operational amplifier 116 equal to the relay setting $X_R$. The signal at the output terminal of the operational amplifier 116 is $\Delta i(t)$. The summing amplifier 62 is comprised of the operational amplifier 116 and the associated resistors.

The output terminal of the operational amplifier 116 is connected to an inverting input terminal of an operational amplifier 124 via a capacitor 122. An output terminal of the operational amplifier 124 is connected to the inverting input terminal thereof via a resistor 126. A non-inverting input terminal of the operational amplifier 124 is connected to ground via a resistor 128. The signal at the output terminal of the operational amplifier 124 is $-X_R\Delta' i(t)$. The operational amplifier 124 and the resistors and capacitors associated therewith constitute the differentiator 64.

Turning now to the voltage-related circuits illustrated in FIG. 8, the signal $v(t)$ from the potential transformer 66 (not shown in FIG. 8) is input to an isolation transformer 130. A first terminal of a secondary coil of the isolation transformer 130 is connected to ground; a second terminal thereof is connected to an inverting input terminal of an operational amplifier 134 via a resistor 132. An output terminal of the operational amplifier 134 is connected to the inverting input terminal thereof via a parallel combination of a capacitor 136 and a resistor 138. A non-inverting input terminal of the operational amplifier 134 is connected to ground via a resistor 140. The isolation transformer 130, the operational amplifier 134, and the resistors and capacitors associated therewith constitute the low pass filter 68.

The output terminal of the operational amplifier 134 is connected to a terminal 141 via a resistor 142. The terminal 141 is connected to an inverting input terminal of an operational amplifier 144 via a capacitor 150. The terminal 141 is also connected to an output terminal of the operational amplifier 144 via a capacitor 146. A resistor 148 is connected between the output terminal of the operational amplifier 144 and the inverting input terminal thereof. A non-inverting input terminal of the operational amplifier 144 is connected to ground via a resistor 152. The signal $v_p(t)$ is produced at the output terminal of the operational amplifier 144. The operational amplifier 144 and the capacitors and resistors associated therewith constitute the bandpass filter 70.

The signal $v_p(t)$ from the operational amplifier 144 is input to an inverting input terminal of an operational amplifier 158 via a resistor 154. The output terminal of the operational amplifier 134 is also connected to the inverting input terminal of the operational amplifier 158 via a resistor 162. An output terminal of the operational amplifier 158 is connected to the inverting input terminal thereof via a resistor 160. A non-inverting input terminal of the operational amplifier 158 is connected to ground via a resistor 156. The signal at the output terminal of the operational amplifier 158 is $\Delta v(t)$. The operational amplifier 158 and the resistors associated therewith constitute the summing amplifier 72.

The signal $\Delta v(t)$ is input to an inverting input terminal of an operational amplifier 168 via a resistor 164. An output terminal of the operational amplifier 168 is connected to the inverting input terminal thereof via a resistor 170. A non-inverting input terminal of the operational amplifier 168 is connected to ground via a resistor 172. The operational amplifier 168 and the associated resistors constitute the inverter 74.

Continuing with the details of the threshold generator 76 illustrated in FIG. 8, the signal $v_p(t)$ is input to an inverting input terminal of an operational amplifier 206 via a resistor 202. The signal $\Delta v(t)$ at the output terminal of the operational amplifier 158 is also connected to the inverting input terminal of the operational amplifier 206 via a resistor 200. An output terminal of the operational amplifier 206 is connected to the inverting input terminal thereof via a resistor 204. A non-inverting input terminal of the operational amplifier 206 is connected to ground via a resistor 208. A signal representative of $-\Delta v(t) - v_{op}(t)$ is present at the output terminal of the operational amplifier 206. The operational amplifier 206, together with the associated resistors, constitutes the threshold generator 76.

The output terminal of the operational amplifier 206 is connected to an anode terminal of a diode 210; a cathode terminal of the diode 210 is connected to a terminal 208. The output terminal of the operational amplifier 124 is connected to an anode terminal of a diode 214; a cathode terminal of the diode 214 is connected to a terminal 212. The terminal 208 is connected to an inverting input terminal of a comparator 220 via a resistor 216. The terminal 208 is also connected to ground via a resistor 222. The terminal 212 is connected to a non-inverting input terminal of the operational amplifier 220 via a resistor 218. The terminal 212 is also connected to ground via a resistor 224. An output terminal of the comparator 220 is connected to the first input terminal of the OR gate 82. The comparator 220 and the resistors and diodes associated therewith constitute the comparator 78 shown in FIG. 8. The output terminal of the comparator 220 goes to a high state if the signal $(-X_R \Delta' i(t))$ at the non-inverting input terminal thereof exceeds the signal $-\Delta v(t) - v_{op}(t))$ at the inverting input terminal thereof during the positive half-cycle.

The output terminal of the operational amplifier 124 is connected to a cathode terminal of a diode 228. An anode terminal of the diode 228 is connected to an inverting input terminal of a comparator 226. The output terminal of the operational amplifier 206 is connected to a cathode terminal of a diode 230. An anode terminal of the diode 230 is connected to a non-inverting input terminal of the comparator 226. The inverting input terminal of the comparator 226 is connected to ground via a resistor 232. The non-inverting input terminal of the comparator 226 is connected to ground via a resistor 234. An output terminal of the comparator 226 is connected to the second input terminal of the OR gate 82. During the negative half-cycle, when the signal $(-X_R \Delta' i(t))$ at the inverting input terminal of the comparator 226 exceeds the signal $-\Delta v(t) - v_{op}(t)$ at the non-inverting input terminal thereof, the output terminal of the comparator 226 goes to a high state.

When the output terminal of the OR gate 82 goes high, the input terminal of the coincidence timer 83 goes to the high state. If this high state persists for the predetermined time, as discussed in conjunction with FIG. 7, the output terminal thereof goes to the high state, causing the trip coil 84 to trip the circuit breaker 54.

Having now discussed the protective relay 50 in detail, the advantages and improvements therein are readily seen. Rescaling of the vertical axis of the X-Y plane such that the vertical unit is $X_R \Delta' i(t)$ allows a moving threshold of unit slope to be defined for all relay settings. Also, the protective relay 50 provides a time-varying threshold according to the equation $\Delta' i(t) X_R = \Delta v(t) + v_{op}(t)$. The results of these improvements is significant reduction in fault detection time for the protective relay 50 since it is unnecessary to wait for the peak values of the voltage deviation and the differentiated current deviation to determine distance or direction to the fault.

What is claimed is:

1. A protective relay for determining the direction to a fault, from a measuring point on an electrical power transmission line energized by an ac power source, said protective relay comprising:

first means for providing a current-derived signal as a function of time, said current-derived signal being representative of the fault-generated current deviation from the steady-state pre-fault current;

second means for providing a voltage-derived signal as a function of time, said voltage-derived signal being representative of the fault-generated voltage deviation from the steady-state pre-fault voltage;

filter means for removing transients due to traveling wave activity from each of said current-derived and voltage-derived signals, thereby producing a filtered current-derived signal and a filtered voltage-derived signal;

third means for transforming at least one of said filtered current-derived signal and said filtered voltage-derived signal such that the transformation results in the order of differentiation of said filtered current-derived signal being one order higher than the order of said filtered voltage-derived signal, with said filtered voltage-derived signal and said filtered current-derived signal of different order being referred to as first and second signals respectively;

fourth means for generating a time-varying trajectory in an X-Y plane using said first and second signals as X and Y coordinates respectively;

fifth means for generating a time-varying threshold boundary in at least two predetermined quadrants of said X-Y plane;

and sixth means for determining when said time-varying trajectory exceeds said time-varying threshold boundary for a predetermined time thereby indicating that the fault is in a first direction from the measuring point.

2. The protective relay of claim 1 wherein the third means includes means for differentiating the filtered current-derived signal.

3. The protective relay of claim 1 wherein the third means includes means for integrating the filtered voltage-derived signal.

4. The protective relay of claim 1 wherein the Y-axis coordinate is the product of the second signal and the reactance of the electrical power transmission line at a predetermined distance from the measuring point.

5. The protective relay of claim 4 wherein the two predetermined quadrants include the second and fourth quadrants.

6. The protective relay of claim 5 wherein the time-varying threshold boundary has unit slope and a Y-axis intercept in the second and fourth quadrants representing the time-varying pre-fault voltage at the fault.

7. The protective relay of claim 6 wherein the time-varying pre-fault voltage at the measuring point represents the time-varying pre-fault voltage at the fault.

8. The protective relay of claim 6 wherein the first direction is the forward direction.

9. The protective relay of claim 1 wherein the fifth means generates the time-varying threshold boundaries in four quadrants of the X-Y plane and wherein the sixth means determines when the time-varying trajectory exceeds the time-varying threshold boundaries for a predetermined time thereby indicating that the fault is in a first or a second direction from the measuring point.

10. The protective relay of claim 1 wherein the sixth means includes a coincidence timer for determining if the time-varying trajectory exceeds the time-varying threshold boundary for the predetermined time.

11. A protective relay for determining if a fault on an electrical power transmission line energized by an ac power source is within a predetermined distance from a measuring point, said protective relay comprising:

first means for providing a current-derived signal as a function of time, said current-derived signal being representative of the fault-generated current deviation from the steady-state pre-fault current;

second means for providing a voltage-derived signal as a function of time, said voltage-derived signal being representative of the fault-generated voltage deviation from the steady-state pre-fault voltage;

filter means for removing transients due to traveling wave activity from each of said current-derived and voltage-derived signals, thereby producing a filtered current-derived signal and a filtered voltage-derived signal;

third means for transforming at least one of said filtered current-derived signal and said filtered voltage-derived signal such that the transformation results in the order of differentiation of said filtered current-derived signal being one order higher than the order of said filtered voltage-derived signal, with said filtered voltage-derived signal and said filtered current-derived signal of different order being referred to as first and second signals respectively;

fourth means for generating a time-varying trajectory in an X-Y plane using said first and second signals as X and Y coordinates respectively;

fifth means for generating a time-varying threshold boundary in at least two predetermined quadrants of said X-Y plane;

and sixth means for determining when said time-varying trajectory exceeds said time-varying threshold boundary for a predetermined time thereby indicating that the fault is within the predetermined distance from the measuring point.

12. A protective relay for determining the direction to a fault, from a measuring point on an electrical power transmission line energized by an ac power source, and for determining if the fault is within a predetermined distance from the measuring point, said protective relay comprising:

first means for providing a current-derived signal as a function of time, said current-derived signal being representative of the fault-generated current deviation from the steady-state pre-fault current;

second means for providing a voltage-derived signal as a function of time, said voltage-derived signal being representative of the fault-generated voltage deviation from the steady-state pre-fault voltage;

filter means for removing transients due to traveling wave activity from each of said current-derived and voltage-derived signals, thereby producing a filtered current-derived signal and a filtered voltage-derived signal;

differentiating means for producing a differentiated signal in response to said filtered current-derived signal;

third means for generating a time-varying trajectory in an X-Y plane wherein the product of said differentiated signal and the reactance of the electrical power transmission line at the predetermined distance from the measuring point is the Y coordinate, and wherein the filtered voltage-derived signal is the X coordinate;

fourth means for generating a first time-varying threshold boundary in the second and fourth quadrants of said X-Y plane wherein said first time-varying threshold boundary has unit slope and a Y-axis intercept in the second and fourth quadrants representing the time-varying pre-fault voltage at the fault, and for generating a second time-varying threshold boundary in the first and third quadrants of said X-Y plane wherein said second time-varying threshold boundary has negative unit slope and a Y-axis intercept in the first and third quadrants representing the negative of the time-varying pre-fault voltage at the fault;

and fifth means for determining when said time-varying trajectory exceeds said time-varying threshold boundary for a predetermined time in the second or fourth quadrants of said X-Y plane thereby indicating that the fault is in a forward direction and within the predetermined distance from the measuring point, and for determining when said time-varying trajectory exceeds said time-varying threshold boundary for a predetermined time in the first or third quadrants of said X-Y plane thereby indicating that the fault is in a reverse direction and within the predetermined distance from the measuring point.

* * * * *